United States Patent
Grunow et al.

(10) Patent No.: US 8,548,420 B2
(45) Date of Patent: Oct. 1, 2013

(54) PANIC BUTTON FOR DATA COLLECTION DEVICE

(75) Inventors: Jonathan T. Grunow, Indian Trail, NC (US); David van Etten, Eindhoven (NL)

(73) Assignee: Hand Held Products, Inc., Skaneateles Falls, NY (US)

( * ) Notice: Subject to any disclaimer, the term of this patent is extended or adjusted under 35 U.S.C. 154(b) by 1158 days.

(21) Appl. No.: 11/867,897

(22) Filed: Oct. 5, 2007

(65) Prior Publication Data

US 2009/0093229 A1  Apr. 9, 2009

(51) Int. Cl.
*H04M 11/04* (2006.01)

(52) U.S. Cl.
USPC ............... 455/404.1; 455/90.1; 455/404.2; 455/456.1; 455/456.6; 455/457; 455/552.1; 455/556.1; 455/556.2; 455/563; 455/566; 345/173

(58) Field of Classification Search
USPC .............. 345/173; 455/90.1, 404.1, 404.2, 455/456.1, 456.6, 457, 552.1, 556.1, 556.2, 455/563, 566

See application file for complete search history.

(56) References Cited

U.S. PATENT DOCUMENTS

| | | | | |
|---|---|---|---|---|
| 5,144,294 | A * | 9/1992 | Alonzi et al. | 340/825.49 |
| 5,991,207 | A * | 11/1999 | Sedlak et al. | 365/189.16 |
| 6,947,612 | B2 | 9/2005 | Helms et al. | |
| 7,410,100 | B2 * | 8/2008 | Muramatsu | 235/462.25 |
| 2006/0201964 | A1 * | 9/2006 | DiPerna et al. | 222/78 |
| 2006/0217105 | A1 * | 9/2006 | Kumar et al. | 455/404.1 |
| 2006/0262800 | A1 * | 11/2006 | Martinez et al. | 370/395.52 |
| 2008/0102785 | A1 * | 5/2008 | Childress et al. | 455/404.1 |
| 2008/0189236 | A1 | 8/2008 | Foster et al. | |
| 2009/0082065 | A1 * | 3/2009 | Kwak | 455/564 |
| 2009/0088216 | A1 * | 4/2009 | Pichler et al. | 455/566 |
| 2010/0169111 | A1 * | 7/2010 | Brue et al. | 705/2 |

OTHER PUBLICATIONS

"DeadMan's Handle: Stops Data Theft in Its Tracks—DMH Manual Version 1.4", DeadMan's Handle Ltd., Copyright 2004, 2005; retrived from http://deadmanshandle.co.uk/papers/DMHManual.pdf on Dec. 2, 2010.*

* cited by examiner

*Primary Examiner* — Kamran Afshar
*Assistant Examiner* — Shahriar Behnamian
(74) *Attorney, Agent, or Firm* — Heslin Rothenberg Farley & Mesiti P.C.

(57) ABSTRACT

A data collection device comprising: a data collection subsystem; a wireless communication device; a dedicated panic button; and a processor that, responsive to a user activating the dedicated panic button, uses the wireless communication device to cause a message to be sent to a designated emergency contact.

18 Claims, 4 Drawing Sheets

PANIC BUTTON FOR DATA COLLECTION DEVICE

BACKGROUND OF THE INVENTION

Data collection devices are a class of device used to collect, process, and transfer data to a data processing system. Data collection devices may be provisioned with one or more of a variety of data collection sub-systems including: imager, laser scanner, RFID scanner, and magnetic media scanner. The data collection sub-systems generally scan some data bearing device such as dataforms (e.g. barcodes), magnetic stripes, and RFID tags. The collected data is processed within the data collection device by a processor and associated circuits. The type and amount of processing may vary depending on the class of device, but usually includes, at a minimum, decoding the output of the data collection sub-system to generate a string of data corresponding to the encoded data contained within the data bearing device. The decoded data may then be transferred using any number of wired and wireless communication paths, such as 802.11, cellular, IrDA, USB, serial and parallel paths.

Generally, data collection devices can be thought of as falling into three classes; fixed, mobile, and handheld. Fixed devices are generally incorporated into stationary objects such as point of sale systems (examples include transaction terminals and image kiosks) and walls (examples include RFID tracking devices). Mobile devices generally have similar electronic configurations to fixed devices, but are mechanically designed to be mounted on movable objects, such as carts and fork lifts. Finally, hand held devices are designed to be carried around by a user (examples include portable data terminals (PDTs), and bar code scanners).

Hand held data collection devices are used in a variety of activities including delivery, security, trucking, and warehousing. Some of these activities place the user of the data collection device in harm's way. For example, the security business by definition involves a professional placing him or herself in harm's way. While other types of activities may not involve the direct threat of harm, many take the user to out of the way places where obtaining help may prove difficult. The present inventors have recognized a need for apparatus and methods to improve the security of users of mobile and hand held data collection devices.

BRIEF DESCRIPTION OF THE DRAWINGS

An understanding of the present invention can be gained from the following detailed description of one or more embodiments of the invention, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. It is to be noted that an element number followed by a letter generally indicates multiple occurrences of elements that are similar in structure and/or function. Further, the use of an italicized "n" associated with an element number generally denotes either an unspecified number of instances of such element or a partial or complete grouping of such elements—the meaning of which is to be drawn from the context of such use.

A method is here, and generally, conceived to be a sequence of steps or actions leading to a desired result and may be implemented as software. While it may prove convenient to discuss such software as if embodied by a single program, most implementations will distribute the described functions among discrete (and some not so discrete) pieces of software. These pieces are often described using such terms of art as "programs," "objects," "functions," "subroutines," "libraries," ".dlls," "APIs" and "procedures." While one or more of these terms may find favor in the present description, there is no intention to limit the scope of the claims through such preferential use.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a microprocessor, but may be executed using other circuits. For example, the methods could be implemented on a digital signal processor, a FPGA, or with HDL (Hardware Design Language) in an ASIC.

Figure 1:
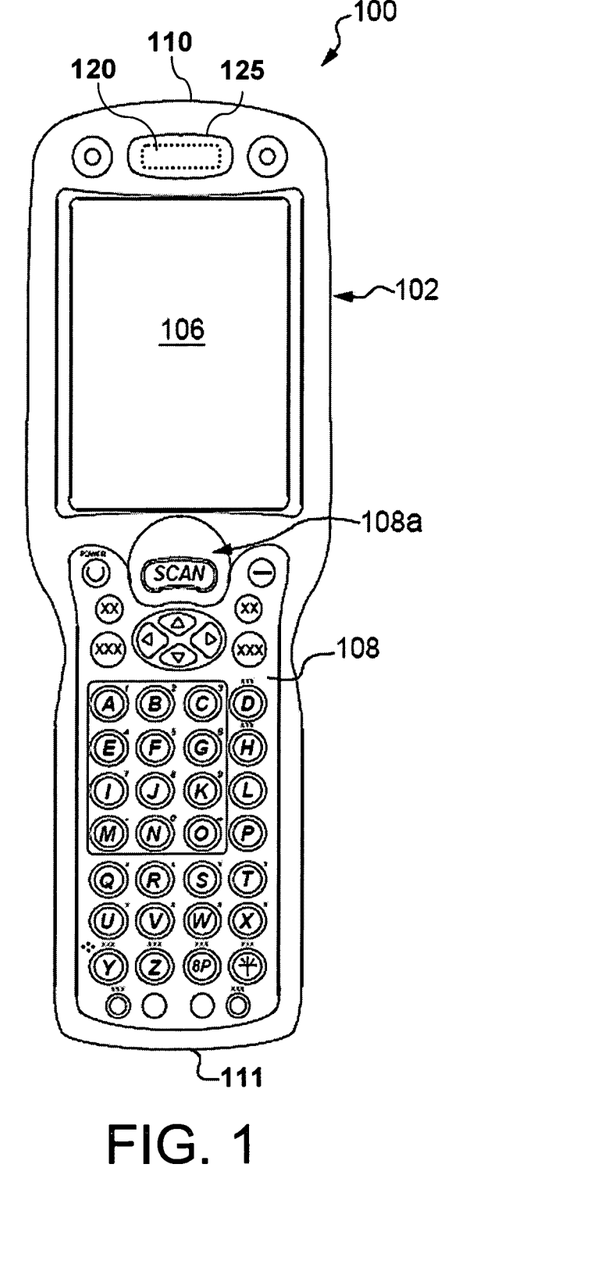
FIG. 1 is a plan view of a PDT in accordance with an embodiment of the present invention.
Figure 2:
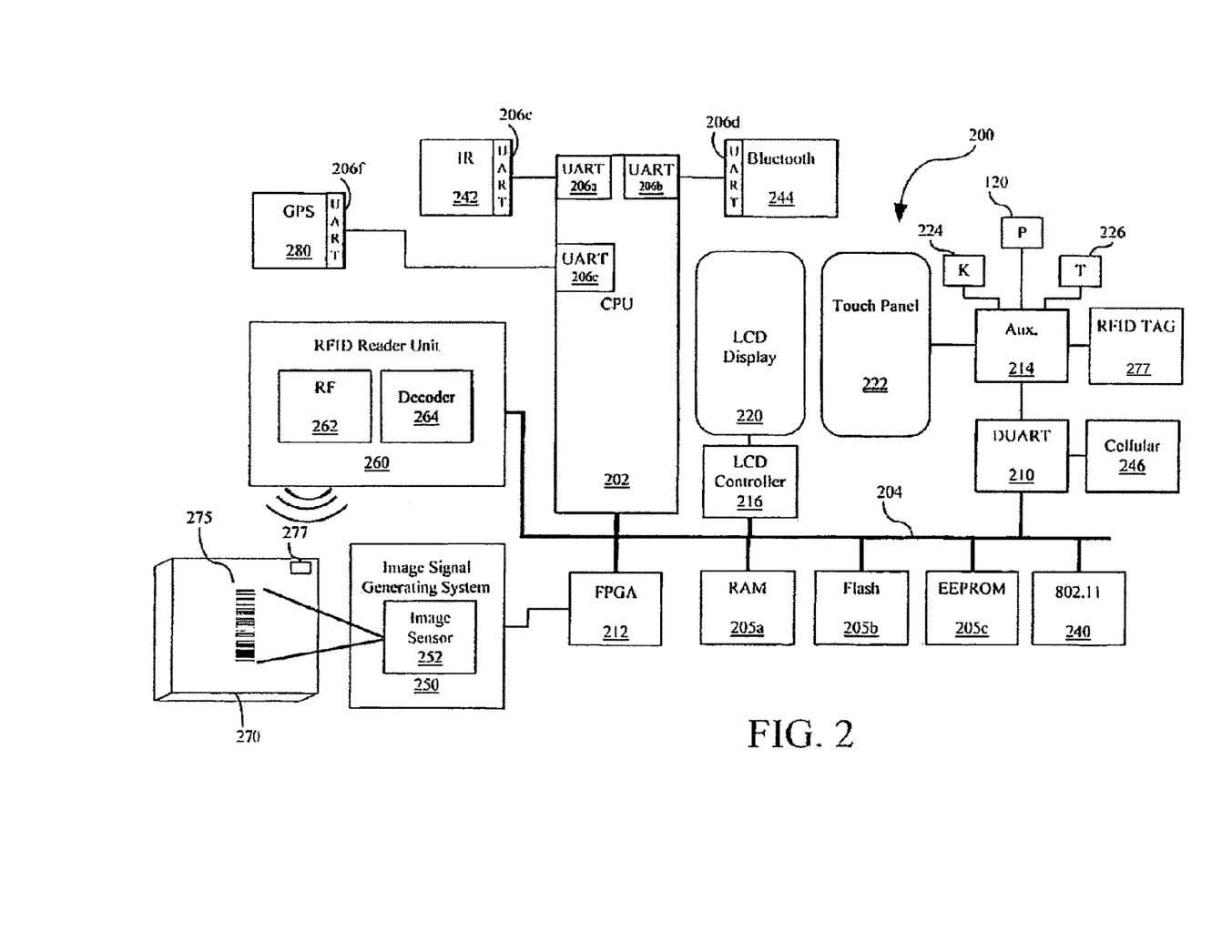
FIG. 2 is a block diagram of a PDT in accordance with an embodiment of the present invention.

FIGS. 1 and 2 illustrate a portable data terminal (PDT) in accordance with a preferred embodiment of the present invention, PDTs generally integrate a mobile computer, one or more data transport paths and one or more data collection subsystems. The mobile computer portion is generally similar to known touch screen consumer oriented portable computing devices (e.g. "Pocket PCs" or "PDAs"), such as those available from PALM, HEWLETT PACKARD, and DELL. The data transport paths include wired and wireless paths, such as 802.11, IrDA. BLUETOOTH, RS-232, USB, CDMA, GSM (incl. GRPS), and so forth. The data collection subsystem generally comprises a device that captures data from an external source, for example, touches, keystrokes, RFID signals, images, and bar codes. PDTs further distinguish from consumer oriented portable computing devices through the use of "industrial" components integrated into a housing that provide increased durability, ergonomics, and environmental independence over consumer oriented devices. Additionally, PDTs tend to provide improved battery life by utilizing superior batteries and power management systems. PDTs are available from several sources, including the assignee of the present application: HAND HELD PRODUCTS, INC.

FIG. 1a is a plan view of a PDT 100. The PDT 100 utilizes an elongated water resistant body 102 supporting a variety of components, including: a battery (not illustrated); a touch screen 106 (generally comprising a LCD screen under a touch sensitive panel); a keypad 108 (including a scan button 108a); a scan engine (not illustrated); and a data/charging port (also not illustrated). The scan engine may comprise, for example, one or more of an image engine, a laser engine, or an RFID engine. The scan engine is generally located near a top end 110 of the PDT 100. The data/charging port typically comprises a proprietary mechanical interface with one set of pins or pads for transmitting and receiving data (typically via a serial interface standard such as USB or RS-232) and a second set of pins or pads for receiving power for operating the system and/or charging the battery. The data charging port is generally located near a bottom end 111 of the PDT 100.

In use, the user presses the scan key 108a to initiate data capture via the scan engine. The captured data is analyzed, e.g. decoded to identify the information represented, stored and, displayed on the touch screen 106. Additional processing of the data may take place on the PDT 100 and/or an external data processing resource to which the data is transmitted.

An additional key 120, referred to herein as the panic button 120, is provided on an exterior of the PDT 100. Activation of the panic button 120 initiates a panic function that sends a message to a predetermined location that the user has activated the panic button. In the example illustrated in FIG. 1, the panic button is recessed in the housing 102 under an optional label 125. The optional label 125 hides the panic button 120 making it suitable to be pressed in secret. The location at the top end of the PDT 100 places the panic button 120 in a highly visible location but one that does not invite inadvertent presses.

FIG. 2a is a block diagram of a known PDT 200. A central processing unit (CPU) 202 receives data from and outputs data to other sub-systems for storage, transmission, and additional processing. The CPU 202 typically comprises one or more of a number of off-the-shelf solutions including: embedded processors, such as an XSCALE® processor available from MARVELL® TECHNOLOGY GROUP; general purpose processors, such as a PENTIUM® 4 available from INTEL& or any number of custom solutions including preconfigured field programmable gate arrays (FPGAs) and application specific integrated circuits (ASICs). Overall operation of the CPU 202 is controlled by software or firmware (typically referred to as an operating system) stored in one or more memory locations 205n, such as: RAM 205a; FLASH memory 205b; and EEPROM 205c. Examples of suitable operating systems for the PDT 200 include graphical user interfaces such as WINDOWS MOBILE®, WINDOWS® CE, WINDOWS® XP, LINUX, PALM®, and OSX operating systems.

In general, communication between the CPU 202 and the various sub-components takes place via one or more ports or busses, including a main system bus 204; a plurality of Universal Asynchronous Receiver/Transmitter (UART) ports 206n; and a Dual Universal Asynchronous Receiver/Transmitter (DUART) 210.

A variety of secondary processors may be provided to perform general and application specific functions. The example illustrated in FIG. 2a provides three such processors: a field programmable gate array (FPGA) 212; an auxiliary processor 214; and an LCD controller 216. The FPGA 212 may comprise any number of FPGAs including the Virtex-4 family of FPGAs available from XILINX. The FPGA 212 is used to interface with one or more data acquisition systems as described hereinafter. The auxiliary processor 214 may comprise any number of embedded (or general purpose) processors, including the PICmicro® family of microcontrollers available from MICROCHIP TECHNOLOGY. The auxiliary processor 214 interfaces with and controls a variety of data input devices including, for example a touch sensitive panel 222, a keypad 224, a scan key or trigger 226, and the panic button 120. The LCD controller 216 may comprise any number of available controllers including, for example, one of the available EPSON LCD controllers. As its name and connections suggest, the LCD controller 216 controls the display of images on an LCD display 220, such as any number of displays available from SHARP. The combination of the LCD 220 and the touch sensitive panel 222 is often referred to as a "touch screen."

The PDT 200 may further include a plurality of communication links that may be used by the panic function to send messages. The communication links may be selected from a variety of available technologies. Example illustrated in FIG. 2 include: an 802.11 communication link 240, an IR communication link 242, a BLUETOOTH® communication link 244, and a cellular communication link 246 for communication with a cellular network such as a network in accordance with the Global System for Mobile Communications (GSM) network. The 802.11 communication link 240 interfaces with the CPU 202 via the main system bus 204. The IR communication link 242, and BLUETOOTH® communication link 244 are connected to the CPU 202 via UART channels 206n. The cellular communication link 246 is connected to the CPU 202 via the DUART 210. Wired communication may be conducted via a UART, such as the UART 206e.

The PDT 200 may be configured to activate a data collection subsystem based on the actuation of a key on the keypad 224 (including the trigger 226) or a touch on the touch panel 222. In addition to the touch panel 222 and keyboard 224, a variety of suitable data collection subsystems may be integrated into the PDT 200. In the example shown in FIG. 2a, three such systems are illustrated: an image signal generation system 250; an RFID reader unit 260 and a GPS receiver 280. Data acquisition subsystems may be controlled with either the main CPU 202 or a secondary processor. For example the image signal generation system 250 is illustrated as being controlled by the FPGA 212. Possible configurations of the FPGA 212 are illustrated in U.S. Pat. No. 6,947,612 incorporated herein by reference. As another example, the RFID reader unit 260 is illustrated as being controlled, via the system bus 204, by the CPU 202.

The image signal generating system 250 generally comprises a two dimensional solid state image sensor 252 (such as a CC, a CMOS, or a CID) for capturing an image containing data, e.g. an, image, a bar code, or a signature. Two-dimensional solid state image sensors generally have a plurality of photo sensor picture elements ("pixels") which are formed in a pattern including a plurality of rows and a plurality of columns of pixels. The image signal generating system 250 further includes imaging optics (not shown) focusing an image onto an active surface of the image sensor 252. Image sensor 252 may be incorporated on an image sensor IC chip having disposed thereon image sensor control circuitry, image signal conditioning circuitry, and an analog-to-digital converter. FPGA 212 manages the capture and transfer of image data into memory 205n. Possible configurations of the FPGA 212 are illustrated in U.S. Pat. No. 6,947,612 incorporated herein by reference. Decoding may be performed by the CPU 202 or any suitable secondary processor. Examples of suitable image signal generation system 250 include the 5000 2D engine series available from Hand Held Products, assignee of the present application, such as the 5X00 and 5X80 engines.

One use of the image signal generating system 250 is reading and interpreting bar codes such as bar code 275 on an item 270. In this mode, when trigger button 226 is actuated, the CPU 202 causes the appropriate control signals to be sent to the image sensor 252. In response thereto, the image sensor 252 outputs digital image data including a representation of the bar code symbol 275. This data is acquired by the FPGA 212 where it is collected and subsequently transferred to memory 205n. In accordance with a decoding program (not specifically illustrated but typically executed by either the FPGA 212 or the CPU 202) an attempt may be made to decode the bar code represented in the captured digital image representation. The capture and decoding of image data may occur automatically in response to a trigger signal being generated by activation of the trigger 226. For example the CPU 202 may be configured, typically through execution of a program resident in memory 205n, to continuously capture and decode bar code symbols represented therein until either a successful decode is completed or the trigger 226 is released. The cycle may also be terminated by timing out after a number of unsuccessful decode attempts.

In addition to having a decode mode of operation, the image signal generation system 250 may also be configured for an image capture mode of operation. In an image capture mode of operation, an electronic image representation is captured without attempting a decode. It is also possible to capture an image including a bar code and then decode the bar code, with or without making use of the non-bar code area of the captured image. The captured electronic image representation may be one or more of (i) stored into a designated memory location of memory 205n, (ii) transmitted to an external device, or (iii) displayed on LCD 220. This mode may be used to capture, for example an image of a signature or damage to a package.

The RFID reader unit 260 includes an RF oscillation and receiver circuit 262 and a data decoder 264. RFID reader unit 260 may be configured to read RF encoded data from a passive RFID tag, such as tag 277, which may be disposed on article 270. In such a case, RF oscillation and receiver circuit 262 transmits a carrier signal to the passive tag which in turn converts the carrier energy to voltage form and actuates a transponder (not shown) to transmit a radio signal representing the encoded tag data. RF oscillator and receiver circuit 262, in turn, receives the radio signal from the tag and converts the data into a digital format. Data decoder 264, typically including a low cost microcontroller IC chip, decodes the received radio signal information received by RF oscillator and receiver circuit 262 to decode the encoded identification data originally encoded into RFID tag 277.

RFID reader unit 260 may, for example, operate in a selective activation mode or in a continuous read operating mode. In a selective activation mode, RFID reader unit 260 broadcasts radio signals in an attempt to activate a tag or tags in its vicinity in response to an RFID trigger signal being received. In a continuous read mode, the RF oscillation and receiver circuit 262 continuously broadcasts radio signals in an attempt to actuate a tag or tags in proximity to the PDT 200 automatically, without receiving a trigger signal. PDT 200 may be configured so that the CPU 202 recognizes a trigger signal under numerous conditions, such as: (1) actuation of the trigger 226; (2) receipt of an RFID trigger instruction (for example generated by a software program) or (3) a determination that some other predetermined condition has been satisfied.

The Global Positioning System (GPS) receiver 280 may comprise any number of readily available modules incorporating a receiver, control circuitry and a patch antenna. For example, the iTrax 100 from FASTRAX is suitable for use in the described embodiments of the present invention. It is to be recognized the GPS receiver 280 is but one example of a suitable Global Navigation Satellite System Receiver (Global Navigation Satellite System (GNSS). Any GNSS may be utilized, including GPS, GLONASS and GALILEO.

Figure 3:
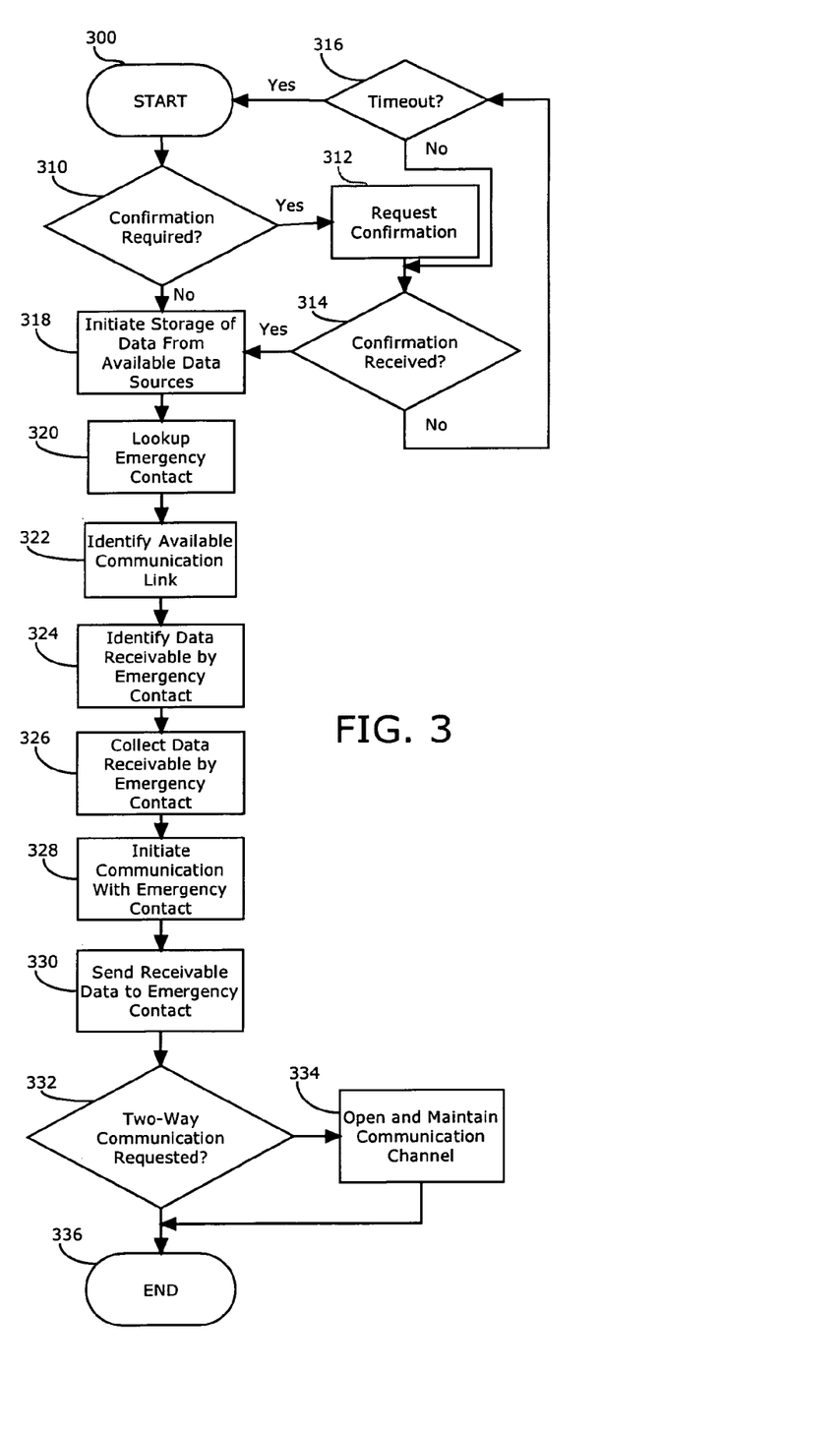
FIG. 3 is a flowchart of a method implementing a panic function in accordance with at least one embodiment of the present invention.

FIG. 3 is a flowchart of a method implementing a panic function in accordance with at least one embodiment of the present invention. The panic function may, for example, comprise software residing in one or more memories 205n or firmware. In general, the primary purpose of the panic function is to reach a third party that can directly provide, or coordinate the provision of assistance. A secondary purpose of the panic function is to provide the third party with information that facilitates the assistance. Generally this comprises the provision of data from sensors on the data collection device. Such data may include, for example: location, temperature, images, and sound.

The method starts in step 300 with the initiation of the panic function. The panic function may be initiated using one or more predetermined actions. For example, activation of panic button 120; pressing of a predetermined combination/sequence of keys 224; tracing of a predetermined pattern on the touch panel 222; using voice recognition to identify a predetermined word or phrase; scanning of a predetermined bar code with the image signal generating system; scanning of a predetermined RFID tag with the RFID reader unit 260; or the output of a predetermined GPS location signal from the GPS unit 280. Once the predetermined action has been recognized an interrupt is generated that leads to the execution of the panic function.

Next in step 310, a check is made as to whether a confirmation is required. Requiring a confirmation to the activation of the panic function will limit false alarms, but may result in a failure to respond to a legitimate emergency when the user is unable to provide confirmation. If confirmation is required, the method proceeds to step 312 wherein confirmation is requested, for example, by displaying a message asking a user to press a button. The button may be the same button/combination used to initially activate the panic function or the button may be a different button/combination. Next, in step 314 a check is made as to whether confirmation has been received. If the confirmation is not received, the method goes to step 316 and a determination is made as to whether a time out condition exists. If a timeout condition exists, e.g. the user has not supplied the confirmation in a predetermined time, the method ends in step 332, otherwise the method returns to step 314 and rechecks if a time out condition has occurred.

After confirmation is received in step 314, or after step 310 if no confirmation is required, the method proceeds to step 318 wherein storage of data is initiated. The data collection device that implements the panic function will generally have a variety of devices that collect and store date. For example, the PDT 200 can collect still images and videos via the image sensor 252 and positional data via the GPS 280. A variety of sensors (e.g. temperature, and accelerometer) may also be available as illustrated in co-pending U.S. patent application Ser. No. 11/669,978, entitled APPARATUS AND METHODS FOR MONITORING ONE OR MORE PORTABLE DATA TERMINALS, incorporated herein by reference. Any one of these data sources may be helpful in understanding the reported emergency and may assist with illuminating the circumstances surrounding the emergency and aid in devising procedures to avoid similar emergencies in the future. As such, the output from any available sensors maybe stored into any available memory. It may prove beneficial to identify which data sensors are to be turned on (if any) and the output thereof recorded so as to ensure that sufficient resources and memory can be devoted to the other steps in the method illustrated in FIG. 3.

Next in step 320, an emergency contact record is retrieved. The emergency contact record identifies one or more contacts to which a call for help is to be placed. An emergency contact may comprise an actual emergency service provider, such as a police or fire (including ambulance) department, a public or private service bureau including those associated with 911, ONSTAR or any number of alarm monitoring services, or a designated contact such as the security office of a corporation. For each contact, the record indicates one or more communication links (and their hierarchy) to be used to connect to the contact, e.g. e-mail, voice, text messaging, etc. . . . . . Additionally, indications may be made as to a preferred format of the contact, including what data may be included, such as GPS, video, etc. . . . . . In the event that a plurality of contacts are identified, an interrelationship may be identified, e.g. are all contacts to be contacted and in what order, or are some only to be contacted in the event that high level contacts are unreachable.

Next in step 322, one or more suitable communication links from those listed in the emergency contact record are identified. For example, if a cellular communication link is specified, but the cellular radio 246 reports that no signal is present, a WiFi connection may be utilized. Similarly, in step 324, one or more data sources as identified in the emergency contact record are identified and in step 326 data collection thereon is initiated. For example, if the emergency contact can accept GPS data, the current location as determined by the GPS unit 280 is prepared for transmission.

Thereafter, in step 328, communication is initiated with the emergency contact via the identified communication path. Once communication has been initiated, the data collected and prepared in step 326 is transmitted to the emergency contact.

In step 332, a check is made as to whether the emergency contact is requesting two way communication with the user of the data collection device that initiated the panic function. Such two-way communication may be facilitated using any of the data collection devices communication links. For example, voice communication may be facilitated by the cellular module 246 or, the 802.11 module 240 (using VoIP). If two way communication is requested, the method proceeds to step 334 and an appropriate communication channel is opened and maintained.

Once all communication is completed, the method ends in step 336.

Although some embodiments of the present invention have been shown and described, it will be appreciated by those skilled in the art that changes may be made in these embodiments without departing from the principles and spirit of the invention, the scope of which is defined in the claims and their equivalents. For example, the panic function may also be configured to erase or encrypt a predetermined section of memory or a predetermined file or group of files. This may prove useful in situations where whatever the user is physically carrying is less valuable than the data on the terminal itself (e.g. patient data, customer data, financial data route details, etc. . . . )

By way of another example, the data collection device need not contact the emergency contact directly, but rather a message may be relayed via a server. The server may be identified in emergency contact record.

Figure 4:
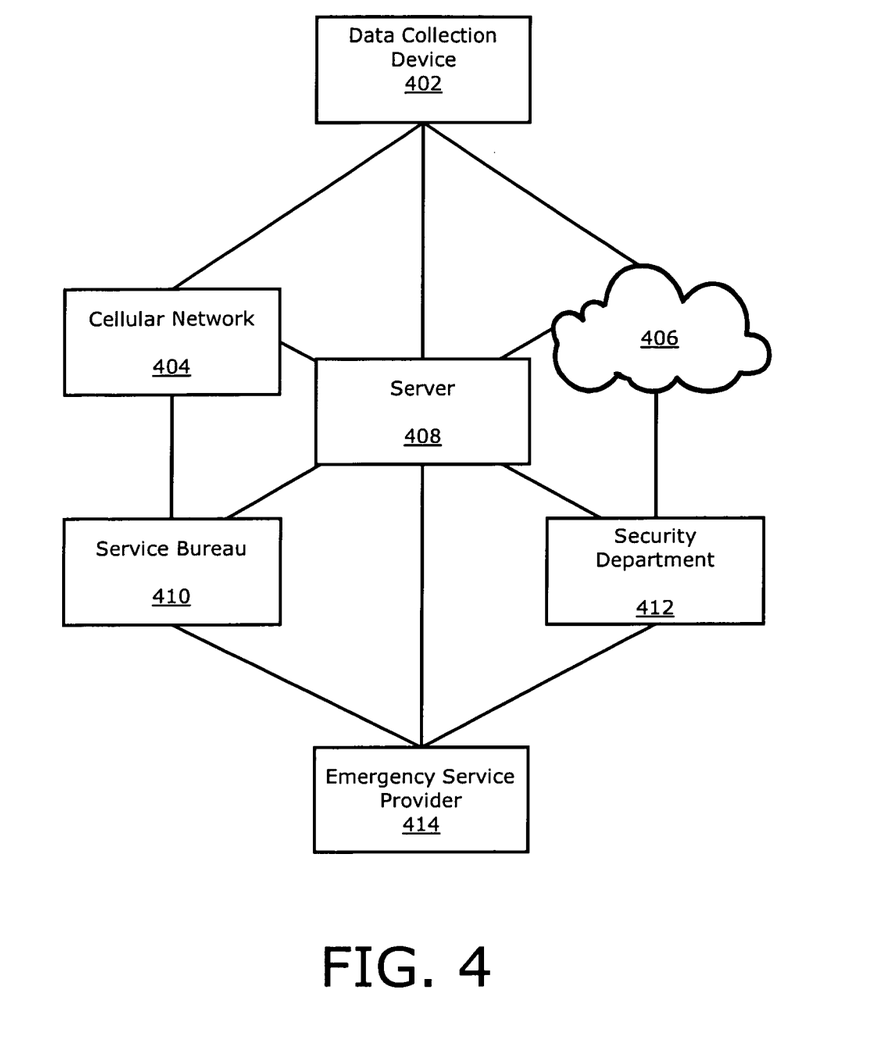
FIG. 4 is a block diagram of a system in accordance with at least one preferred embodiment of the present invention.

FIG. 4 is a block diagram of a system in accordance with at least one preferred embodiment of the present invention. In particular, FIG. 4 illustrates several communication links that may be employed by embodiments of the present invention. A data collection device 402 is capable of employing two communications links: a cellular network 404 and/or the internet 406. The communication link may lead directly to a service provider, such as the illustrated service bureau 410, corporate security department 412 or emergency service provider 414. Alternatively, the data collection device 402 may connect to a designated server 408 which handles the communication with the service providers 410-414. Once again, the connection between the server 408 and the service providers 410-414 may be via any available communication link, including the illustrated cellular network or internet 406. Please note that only a sub-set of the possible combinations are illustrated in FIG. 4 to preserve clarity.

A data collection device includes: a data collection subsystem; a wireless communication device: a dedicated panic button; and a processor that, responsive to a user activating the dedicated panic button, uses the wireless communication device to cause a message to be sent to a designated emergency contact; a server that receives an indication that the dedicated panic button has been activated and upon the receipt of the indication, contacts the designated emergency contact; and wherein the processor, in response to a user activating the dedicated panic button, causes a message to be sent via the wireless data communication device to the server indicating that the dedicated panic button has been pressed.

A data collection device includes: a data collection subsystem; a wireless communication device: a dedicated panic button; and a processor that, responsive to a user activating the dedicated panic button, uses the wireless communication device to cause a message to be sent to a designated emergency contact, wherein the dedicated panic button is activated by pressing and holding the dedicated panic button for a predetermined period of time.

A data collection device includes: a data collection subsystem; a wireless communication device: a dedicated panic button; and a processor that, responsive to a user activating the dedicated panic button, uses the wireless communication device to cause a message to be sent to a designated emergency contact; a keypad with a plurality of keys and wherein the dedicated panic button is a two stage button that provides a different operational feel than any of the plurality of keys.

A data collection device includes: a data collection subsystem; a wireless communication device: a keyboard; a processor that, responsive to a user pressing a predetermined combination of two or more keys, uses the wireless communication device to cause a message to be sent to a designated emergency contact, a server that receives an indication that the predetermined combination has been pressed and upon the receipt of the indication, contacts the designated emergency contact; and wherein the processor, upon recognition of the pressing of the predetermined combination, causes a message to be sent via the wireless data communication device to the server indicating that the dedicated button has been pressed.

What is claimed is:
1. A data collection device comprising:
an image signal generating system for reading and interpreting bar codes;
a scan key to initiate reading and interpreting bar codes;
a memory for storing bar code data;
a temperature sensor communicatively coupled to the memory;
a wireless communication device;
a dedicated panic button; and
a processor in communication with the memory, wherein the data collection device is configured to perform a method, the method comprising:
receiving, by the processor, an alert responsive to a user activating the dedicated panic button;
switching, by the processor, the image signal generating system to an image capture mode, responsive to receiving the alert;

capturing, by the image signal generating system, responsive to being switched into image capture mode, image data and saving the image data in the memory;

capturing, by the temperature sensor, temperature data and saving the temperature data in the memory;

compiling, by the processor, a message comprising the image data and the temperature data;

retrieving a designated emergency contact record from the memory; and utilizing the wireless communication device to send a message to the designated emergency contact; and erasing, by the processor, scan data stored in a predetermined section of the memory or a predetermined file or group of files in the memory in response to receiving the alert.

2. A data collection device, as set forth in claim 1, the method further comprising:

sending, by the processor, to a server, via the wireless data communication device, responsive to receiving the alert, an indication that the dedicated panic button has been activated, the server, responsive to receiving the indication, sending a message to the designated emergency contact.

3. A data collection device, as set forth in claim 1, further comprising:

a global navigation satellite system receiver that outputs location data; and wherein, responsive to the alert, the global navigation satellite system stores current location data relating to the position of the data collection device in the memory, and wherein the message further comprises the current location data from the global navigation satellite system receiver.

4. A data collection device, as set forth in claim 1, further comprising a touch screen and wherein the dedicated panic button is located above the touch screen when the data collection device is held vertically with the touch screen facing the user in a normal orientation.

5. A data collection device, as set forth in claim 1, further comprising a housing supporting the data collection subsystem, the wireless communication device, and the dedicated panic button; and wherein the dedicated panic button is located in a recess of the housing.

6. A data collection device, as set forth in claim 5, further comprising a label covering the dedicated panic button that hides the panic button making it suitable to be pressed in secret.

7. A data collection device, as set forth in claim 1, wherein the dedicated panic button is activated by pressing and holding the dedicated panic button for a predetermined period of time.

8. A data collection device, as set forth in claim 1, further comprising a keypad with a plurality of keys and wherein the dedicated panic button is a two stage button that provides a different operational feel than any of the plurality of keys.

9. A data collection device comprising:

an image signal generating system for reading and interpreting bar codes;

a scan key to initiate reading and interpreting bar codes;

a memory for storing scan data;

a wireless communication device;

a dedicated panic button; and a processor in communication with the memory, wherein the data collection device is configured to perform a method, the method comprising:

receiving, by the processor, an alert responsive to a user activating the dedicated panic button;

retrieving a designated emergency contact record from the memory; and utilizing the wireless communication device to send a message to the designated emergency contact; and encrypting and retaining in the memory, by the processor, scan data stored in a predetermined section of the memory or a predetermined file or group of files in the memory in response to receiving the alert.

10. A data collection device, as set forth in claim 9, further comprising:

a global navigation satellite system receiver that outputs location data; and wherein, responsive to the alert, the global navigation satellite system stores current location data relating to the position of the data collection device in the memory, and wherein the message further comprises the current location data from the global navigation satellite system receiver.

11. A data collection device, as set forth in claim 9, the method further comprising:

sending, by the processor, to a server, via the wireless data communication device, responsive to receiving the alert, an indication that the dedicated panic button has been activated, the server, responsive to receiving the indication, sending a message to the designated emergency contact.

12. A data collection device, as set forth in claim 9, further comprising a touch screen and wherein the dedicated panic button is located about the touch screen when the data collection device is held vertically with the touch screen facing the user in a normal orientation.

13. A data collection device, as set forth in claim 9, further comprising a housing supporting the data collection subsystem, the wireless communication device, and the dedicated panic button; and wherein the dedicated panic button is located in a recess or the housing.

14. A data collection device, as set forth in claim 13, further comprising a label covering the dedicated panic button that hides the panic button making it suitable to be pressed in secret.

15. A data collection device, as set forth in claim 9, wherein the dedicated panic button is activated by pressing and holding the dedicated panic button for a predetermined period of time.

16. A data collection device, as set forth in claim 9, further comprising a keypad with a plurality of keys and wherein the dedicated panic button is a two stage button that provides a different operational feel than any of the plurality of keys.

17. A data collection device comprising:

an image signal generating system for reading and interpreting bar codes;

a scan key to initiate reading and interpreting bar codes;

a plurality of data collection sensors for collecting sensor data wherein at least one sensor collects temperature data;

a memory for storing scan and sensor data;

a wireless communication device;

a processor that, responsive to scan data or sensor data that includes at least one of the following: voice recognition to identify a predetermined word or phrase; scanning of a predetermined bar code; scanning of a predetermined RFID tag and a predetermined GPS location, uses the wireless communication device to cause a message to be sent to a designated emergency contact wherein the message comprises temperature data retrieved by the processor from the memory.

18. A data collection device in accordance with claim 17, wherein the plurality of sensors comprises at least one of the following: image data; video data; temperature data and accelerometer data and wherein the processor uses the wireless communication device to cause stored sensor data to be sent to a designated contact.

* * * * *